(12) United States Patent
Kim et al.

(10) Patent No.: US 6,236,965 B1
(45) Date of Patent: May 22, 2001

(54) METHOD FOR AUTOMATICALLY GENERATING PRONUNCIATION DICTIONARY IN SPEECH RECOGNITION SYSTEM

(75) Inventors: Hoi-Rin Kim; Young-Jik Lee, both of Taejon (KR)

(73) Assignee: Electronic Telecommunications Research Institute, Seoul (KR)

(*) Notice: Subject to any disclaimer, the term of this patent is extended or adjusted under 35 U.S.C. 154(b) by 0 days.

(21) Appl. No.: 09/414,350

(22) Filed: Oct. 7, 1999

(30) Foreign Application Priority Data

Nov. 11, 1998 (KR) .................................................. 98-48201

(51) Int. Cl.⁷ .............................. G10L 15/02; G10L 15/06
(52) U.S. Cl. .......................... 704/254; 704/251; 704/232
(58) Field of Search .................................... 704/202, 259, 704/243, 251, 260, 266, 232, 254, 255, 249

(56) References Cited

U.S. PATENT DOCUMENTS

| | | | |
|---|---|---|---|
| 5,317,673 | * 5/1994 | Cohen et al. | 704/232 |
| 5,893,058 | * 4/1999 | Kosaka | 704/254 |
| 6,064,959 | * 5/2000 | Young et al. | 704/251 |
| 6,078,885 | * 6/2000 | Beutnagel | 704/260 |

* cited by examiner

Primary Examiner—Richemond Dorvil
Assistant Examiner—Daniel A. Nolan
(74) Attorney, Agent, or Firm—Antonelli, Terry, Stout & Kraus, LLP (57) ABSTRACT

A method for automatically generating a pronunciation dictionary in a speech recognition system is disclosed. Pronunciation patterns of a large scale pronunciation dictionary are learned through a neural network without resorting to a phonetic knowledge, and the pronunciation sequences for input words are accurately formed by utilizing an exception grapheme pronunciation dictionary, an exception word pronunciation dictionary for graphemes and words prohibiting the formation of an accurate pronunciation dictionary through the learning neural network, thereby reducing the size of the memory and the amount of calculations. A multi-layer perceptron for directly mapping phonemes relevant to respective graphemes is taught by utilizing a neural network, so as to form an exception word pronunciation dictionary data base, an exception grapheme pronunciation dictionary data base, and a phoneme output multi-layer perceptron parameter data base for respective graphemes. The exception word pronunciation dictionary data base, the exception grapheme pronunciation dictionary data base, and the phoneme output multi-layer perceptron parameter data base for the input word thus pre-processed is inspected, to post-process the pronunciation sequences for the relevant word.

15 Claims, 4 Drawing Sheets

METHOD FOR AUTOMATICALLY GENERATING PRONUNCIATION DICTIONARY IN SPEECH RECOGNITION SYSTEM

BACKGROUND OF THE INVENTION

1. Field of the Invention

The present invention relates to a method for automatically generating a pronunciation dictionary in a speech recognition system, in which pronunciation sequences are accurately generated for vocabularies non-registered in a lexicon (dictionary) by utilizing an exception word pronunciation dictionary, an exception grapheme pronunciation dictionary and grapheme-wise multi-layer perception, and thus the size of memory and the amount of calculations can be reduced in the stepwise processing.

2. Description of the Prior Art

Figure 1:
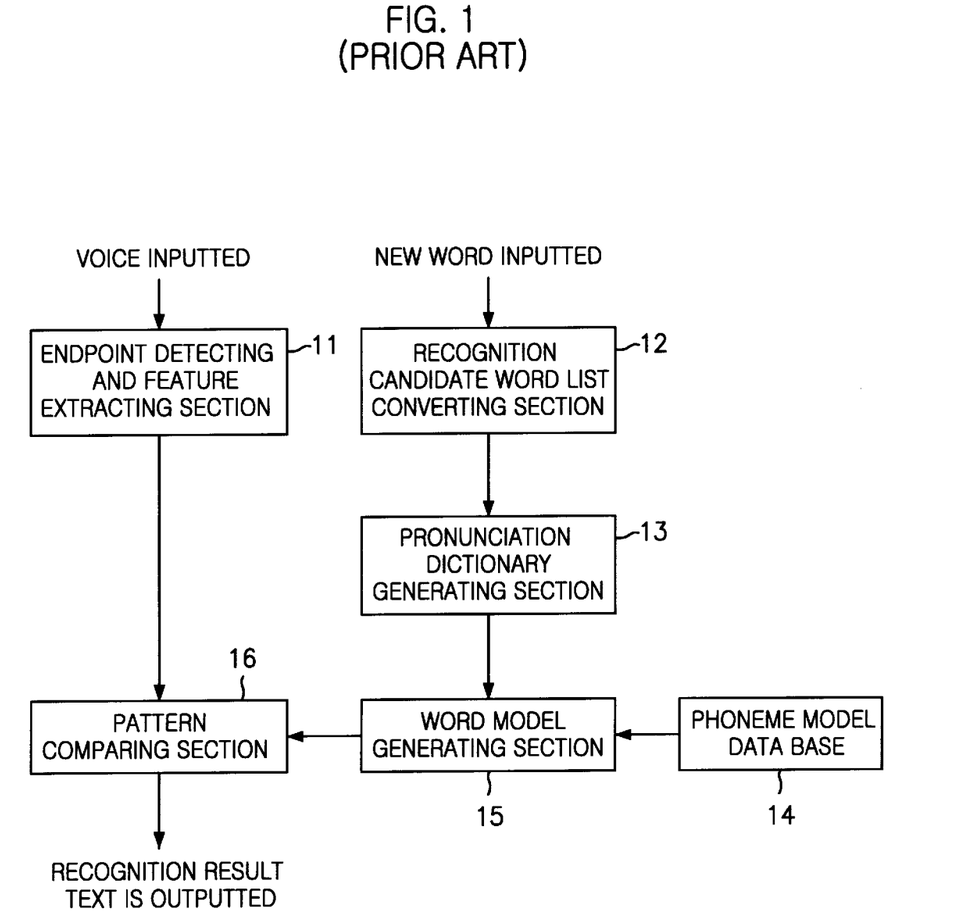
FIG. 1 illustrates the constitution of the general speech recognition system.

FIG. 1 illustrates the constitution of the general speech recognition system.

The constitution and operation of the general speech recognition system are well known in this field, and therefore, the descriptions of them will be skipped here. However, the procedure of outputting the speech recognition result in the form of text will be described in detail below.

As shown in FIG. 1, if a speech is inputted in the general speech recognition system, an endpoint detecting and feature extracting section 11 detects the period In which a speech exists, so as to extract the feature vector of the period.

Meanwhile, if an information on a vocabulary which is recognizable by the speech recognition system is inputted, then a recognition candidate word list converting section 12 alters the recognition candidate word list. Then a pronunciation dictionary generating section 13 forms a pronunciation sequences of the respective words by referring to the dictionary or based on the pronunciation rules. Then a word model generating section 15 combines the generated pronunciation sequences of the pronunciation dictionary generating section 13 with respective phoneme model data bases 14, thereby forming a word model for each candidate word.

Finally, a pattern comparing section 16 compares the word models of the word model generating section 15 with the extracted input speech feature vectors of the endpoint detecting and feature extracting section 11 so as to output the closest candidate word as the recognition result.

Figure 2:
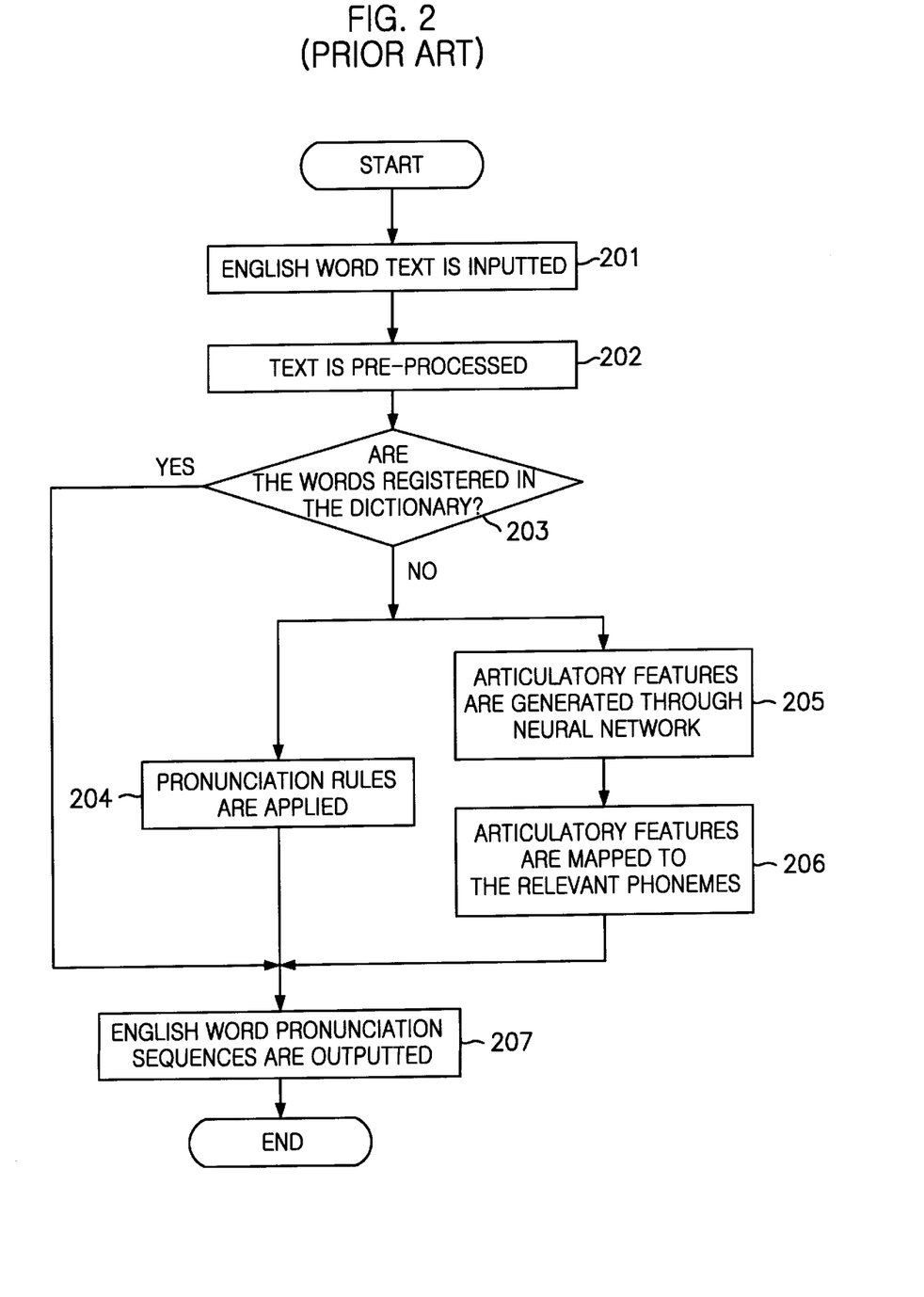
FIG. 2 is a flow chart showing the conventional procedure of forming the English pronunciation dictionary.

FIG. 2 is a flow chart showing the conventional procedure of forming the English pronunciation dictionary. That is, FIG. 2 illustrates the procedure of forming the pronunciation dictionary by the pronunciation dictionary generating section 13 of FIG. 1.

As shown in FIG. 2, the conventional procedure of generating the English word pronunciations is carried out in the following manner. That is, first a text of recognition candidate words is inputted (201). Then, numerals are converted to letters, and punctuations are removed, thereby carrying out a pre-processing on the text. Thus the text is converted into a processable alphabet letters (202).

Then a checking is carried out as to whether the English word thus obtained is present in a registered pronunciation dictionary (203).

If it is found that the English word is present in the registered pronunciation dictionary, then the English word pronunciation sequences are outputted (207).

On the other hand, if the English word is not found in the registered pronunciation dictionary, then pronunciation sequences are generated based on either one of the following two methods.

First, the English pronunciation rules are applied (204) to output English word pronunciation sequences (207).

Second, a neural network is utilized to generate articulatory features in accordance with the upstream and downstream connections of the respective graphemes (205). Then the articulatory features are mapped to the relevant phoneme (206), thereby outputting English word pronunciation sequences (207).

As described above, the speech recognition is a technique in which the pronunciation of the user is analyzed, and its meaning is determined.

In the conventional speech recognition system, the object vocabularies to be recognized are determined in advance, and if the user pronounces one or more of the object vocabularies, then the closest words are detected and outputted.

However, in this recognition system, it is focused to detecting proper words from the predetermined registered vocabularies. Therefore, if a non-registered new word is to be recognized, the performance is deteriorated.

When recognizing a new non-registered word by using such a recognition apparatus, there are two techniques to be solved for an accurate recognition.

One of them is a technique of properly modeling the basic pattern for a new word to carry out a modeling in phoneme or allophone. Another is technique of automatically generating pronunciation dictionary by connecting a new word to a defined phoneme or allophone.

The pronunciation dictionary automatic generation technique has different handling methods depending on the words to be handled. For example, in the case of Korean words, a proper formation of pronunciation dictionary for each word can be mostly carried out based on 10 or more pronunciation rules and several exception rules. If the words which cannot be expressed by the basic rules are provided with exception pronunciation dictionaries, then accurate pronunciation dictionaries for almost all the vocabularies and proper nouns can be generated.

In the case of English, however, it is impossible to form accurate pronunciation dictionaries for any words based on the aforementioned.

Therefore, conventionally there is formed a large scale pronunciation dictionary containing 100 thousand words or more. Then for proper nouns and coined words, the dictionary is revised or pronunciation dictionaries are formed based on simple pronunciation rules.

The conventional methods of forming the English pronunciation dictionaries are classified into two kinds. One of them is a method of programming several pronunciation rules. Another is a method of resorting to a speech synthesis. That is, the articulatory features for the respective phonemes are defined based on the phonetic knowledge. Then based on this, the articulatory features are found for the grapheme input by utilizing a neural network and then this is applied to the relevant phonemes.

However, in the former method, due to the diversified pronunciation features of the English language, there are difficulties in forming accurate pronunciation dictionaries for any arbitrary words. In the latter, it is based on the inaccurate experimental phonetic knowledge and is based on applying it to the phoneme. Therefore, it is impossible to form an accurate pronunciation dictionary.

SUMMARY OF THE INVENTION

The present invention is intended to overcome the above described disadvantages of the conventional techniques."

Therefore it is an object of the present invention to provide a method for automatically generating a pronunciation dictionary in a speech recognition system, and a recording medium readable by a program of a computer for achieving the same, in which pronunciation patterns of a large scale pronunciation dictionary are learned through a neural network without resorting to a phonetic knowledge, and the pronunciation sequences for input words are accurately formed by utilizing an exception grapheme pronunciation directory or an exception word pronunciation dictionary for graphemes or words prohibiting the formation of an accurate pronunciation dictionary through the learning neural network, thereby reducing the size of the memory and the amount of calculations.

In achieving the above object, the method for automatically generating pronunciation dictionaries in a speech recognition system according to the present invention includes the steps of: learning a multi-layer perceptron for directly mapping phonemes relevant to respective graphemes by utilizing a neural network, so as to form an exception word pronunciation dictionary data base, an exception grapheme pronunciation dictionary data base, and a phoneme output multi-layer perceptron parameter data base for respective graphemes; and inspecting the exception word pronunciation dictionary data base, the exception grapheme pronunciation dictionary data base, and the phoneme output multi-layer perceptron parameter data base for the input word thus pre-processed, to post-process pronunciation sequences for the relevant word.

In another aspect of the present invention, the recording medium readable by a computer loaded with a program according to the present invention has the functions of: forming an exception word pronunciation dictionary data base, an exception grapheme pronunciation dictionary data base, and a phoneme output multi-layer perceptron parameter data base for respective graphemes by learning a multi-layer perceptron for directly mapping phonemes relevant to respective graphemes by utilizing a neural network; and inspecting the exception word pronunciation dictionary data base, the exception grapheme pronunciation dictionary data base, and the phoneme output multi-layer perceptron parameter data base for the input word thus pre-processed, to post-process pronunciation sequences for the relevant word.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 3:
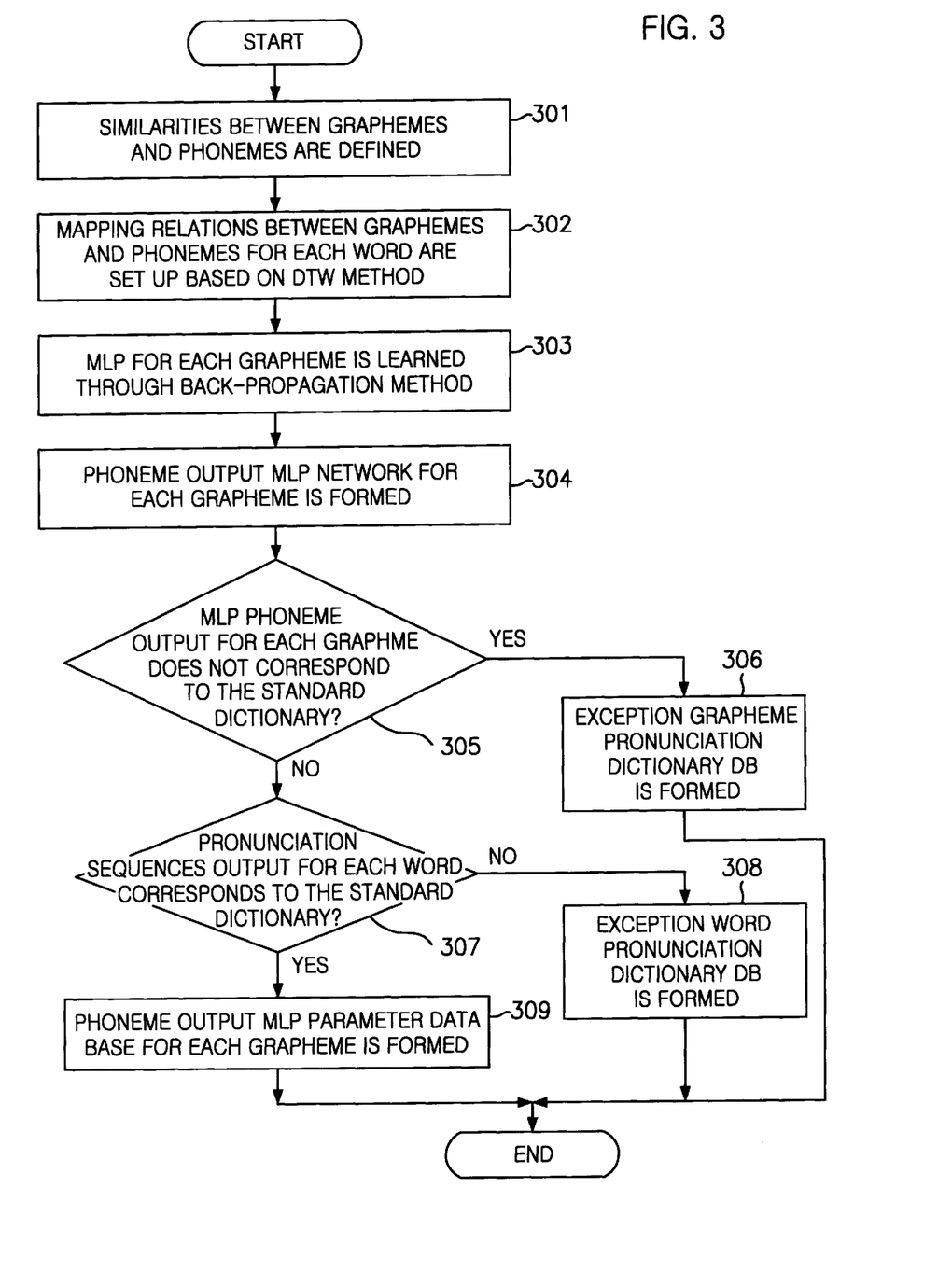
FIG. 3 is a flow chart showing the pronunciation dictionary learning procedure for automatically generating the pronunciation dictionary according to the present invention.

FIG. 3 is a flow chart showing the pronunciation dictionary learning procedure for automatically generating the pronunciation dictionary according to the present invention.

The present invention provides a method for automatically generating a pronunciation dictionary for accurately recognizing a new word which is not registered in a pronunciation recognition system. That is, by utilizing an exception word pronunciation dictionary data base, an exception grapheme pronunciation dictionary data base, and a phoneme output multi-layer perceptron parameter data base, there are accurately generated pronunciation sequences of the input word. Thus in accordance with the stepwise processing, there can be decreased the memory size and the calculation amount.

In the method of the present invention, the pronunciation patterns of a large scale pronunciation dictionary is learned without resorting to the phonetic knowledge. The graphemes and words for which the pronunciation dictionaries cannot be generated based on the learned neural network are expressed in exception grapheme pronunciation dictionaries and exception word pronunciation dictionaries. Thus in generating an English pronunciation dictionary, a far more superior effect is reaped compared with the case of resorting to rules, even without utilizing the inaccurate experimental phonetic knowledge.

If the pronunciation patterns are to be learned from a pronunciation dictionary containing 100 thousand words or more through the neural network without resorting to the phonetic knowledge, the following are required. That is, first a pre-processing step has to be carried out in which the phonemes corresponding to the respective graphemes are matched one to one in accordance with the upstream and downstream connections of the clause. In this manner, the neural network is learned in accordance with the learning data thus prepared. Thus if a multi-layer perceptron (MLP) is obtained, the words which are present in the original pronunciation dictionary are inputted. If they do not correspond to the pronunciation sequences of the pronunciation dictionary, then they are registered in the exception grapheme and word pronunciation dictionaries, while an MLP is formed for the words which do correspond.

As shown in FIG. 3, the procedure of learning the pronunciation dictionary for automatically generating the pronunciation dictionary according to the present invention is carried out in the following manner. That is, in order to learning the multi-layer perceptron (MLP) which directly maps the phonemes for the respective graphemes through the neural network, it has to be automatically decided which phonemes of the relevant word the respective graphemes are mapped to, from the standard pronunciation dictionary containing 100 thousand words or more.

For this purpose, the similarities between the graphemes and phonemes of the English word are defined based on the knowledge and instances (301). By utilizing these similarities, the correspondence relationships between the graphemes and phonemes are defined based on a dynamic time warping (302). Here, if a grapheme is mapped to two or more phonemes, then the whole word is registered into the exception word pronunciation dictionary later (308).

Thereafter, the MLPs for the respective graphemes are learned in a back-propagation method based on the obtained grapheme-phoneme mapping data (303).

During the learning, an input node receives three graphemes before and after the relevant grapheme, but if the performance is too low after the learning, then the input node receives four graphemes before and after the relevant grapheme by utilizing the connection information before and after the relevant grapheme.

The hidden layer of the MLP is made to have a value between 30 and 50 by considering the outputtable number of phonemes and the experimental results. Further, an output node is defined with the phonemes corresponding to the relevant grapheme.

Through this procedure, a phoneme output MLP network corresponding to each of 26 alphabetic (graphemes) is formed (304).

Then an analysis is carried out on whether the phoneme output of the MLP for each of the graphemes in a standard English pronunciation dictionary does not correspond to the phoneme in the standard dictionary, and always one kind of result is outputted (305).

Upon the analysis, if the MLP phoneme output for each grapheme does not correspond to the standard dictionary, out always one kind of result is outputted, then this is registered in the exception grapheme pronunciation dictionary, thereby forming an exception grapheme pronunciation dictionary (306). Otherwise, a checking is carried out as to whether the pronunciation output always corresponds to the standard dictionary (307).

Upon the checking, if it is found that it does not correspond, then it is registered into the exception word pronunciation dictionary, thereby forming an exception word pronunciation dictionary (308). On the other hand, if it corresponds, then the output of the pronunciation sequences of the respective words can be replaced with the MLP output. Therefore, this is registered into the phoneme output MLP parameter data base for each grapheme, thereby forming a phoneme output MLP parameter data base for each grapheme (309).

Figure 4:
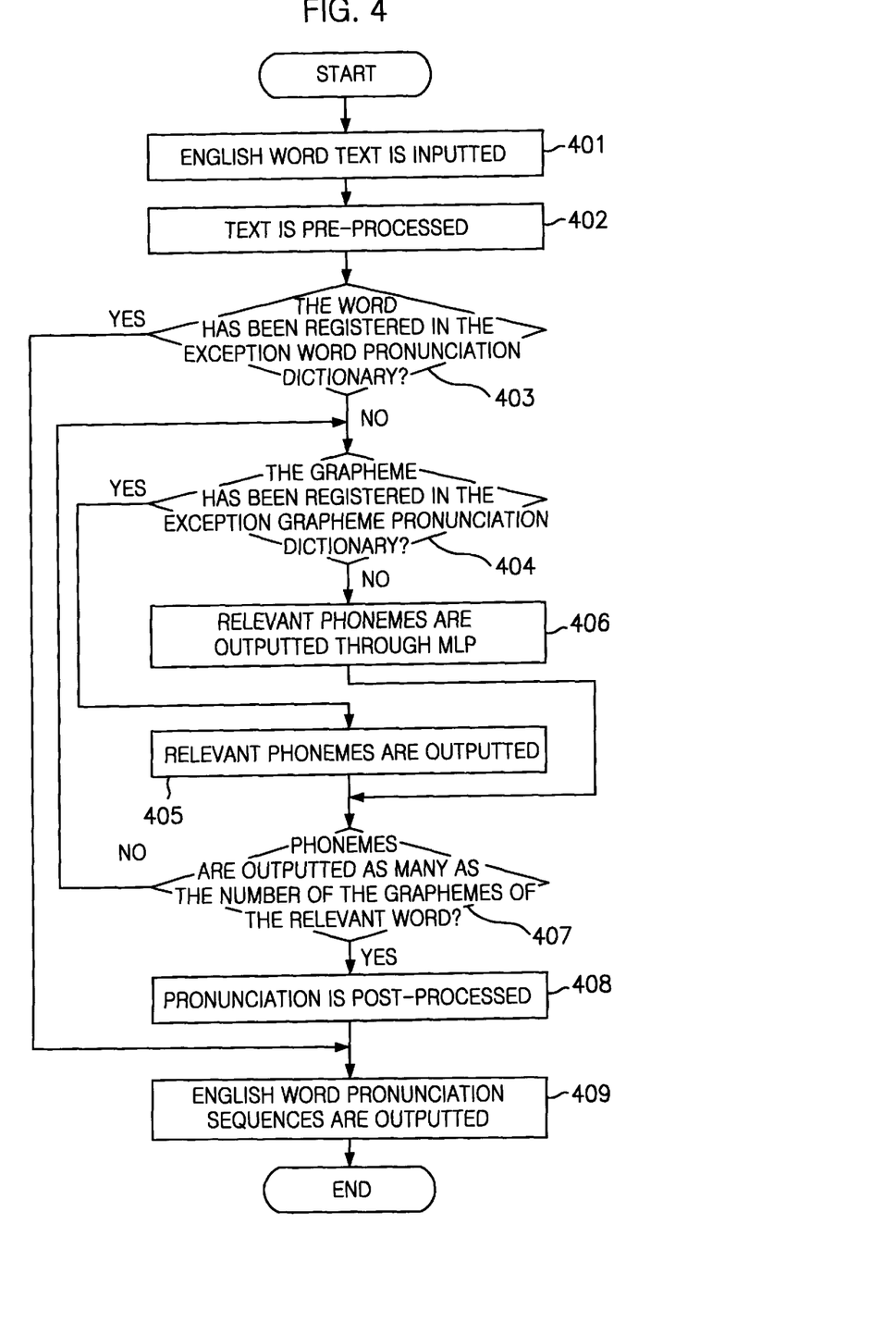
FIG. 4 is a flow chart showing the method for automatically generating the pronunciation dictionary according to the present invention.

FIG. 4 is a flow chart showing the method for automatically generating the pronunciation dictionary according to the present invention.

As shown in FIG. 4, the method for automatically generating the pronunciation dictionary according to the present invention is carried out in the following manner. That is, first data on a candidate word is inputted (401). Then a pre-processing on the text is carried out by changing the numerals into alphabetic letters or by removing punctuations marks (402).

Then an analysis is carried out on whether the inputted word has been a registration in the exception word pronunciation dictionary data base ((403). If the inputted word has been registered, then the registered pronunciation sequences are outputted (409). If the inputted word has not been registered, then a checking is carried out as to whether the graphemes of the word have been registered in the exception grapheme pronunciation dictionary data base (404).

Upon the checking, if it is found that they have been registered, then the relevant phonemes are outputted (405), and then, a judgment is made as to whether the phonemes have been outputted as much as the number of the graphemes of the inputted word (407).

Upon checking, if it is found that the inputted word has not been registered in the exception grapheme pronunciation dictionary data base, then the relevant phonemes are outputted to the MLP by utilizing the phoneme output MLP parameter data base for each grapheme (406). Then a judgment is made as to whether the outputting has been made as much as the number of the graphemes of the inputted word (407).

Upon judging, if it is found that the outputting has not been made as much as the number of the graphemes of the inputted word, then a checking is made as to whether the graphemes of the inputted word have been registered in the exception grapheme pronunciation data base (404).

Upon judging, if it is found that the outputting has been made as much as the number of the graphemes of the inputted word, then a post processing is carried out by reducing the connected same phonemes into one or by removing a silence phoneme (408). Then finally, pronunciation sequences of the English word is outputted (409).

In the above described method, when the pronunciation dictionary is learned through the neural network, the possibility of faulty learning due to an inaccurate phonetic knowledge can be decreased, thereby improving the accuracy of the pronunciation sequences. Further, in the case where the learned neural network accurately forms pronunciation sequences, the relevant word is excluded from the exception pronunciation dictionary, with the result that the required memory size is reduced, and that the calculation amount can be reduced during the search into the pronunciation dictionary.

In the above, the present invention was described based on the specific preferred embodiment, but it should be apparent to those ordinarily skilled in the art that various changes and modifications can be added without departing from the spirit and scope of the present invention.

According to the present invention as described above, accurate pronunciation sequences can be outputted for words which have not been registered in a large scale dictionary. Therefore a highly accurate speech recognition system can be formed. Further, when generating pronunciation sequences for an unregistered word, there are not resorted to the articulatory features and the inaccurate pronunciation rules. Therefore, accurate pronunciation sequences can be outputted. Further, in the present invention, an exception grapheme pronunciation dictionary is additionally used, and therefore, the memory size and the calculation amount can be reduced compared with the case where only the exception word pronunciation dictionary is used.

What is claimed is:

1. A method for automatically generating pronunciation dictionaries in a speech recognition system, comprising the steps of:
   a) learning a multi-layer perceptron for directly mapping phonemes relevant to respective graphemes by utilizing a neural network so as to form an exception word pronunciation dictionary data base, an exception grapheme pronunciation dictionary data base and a phoneme output multi-layer perceptron parameter data base for respective graphemes; and
   b) inspecting said exception word pronunciation dictionary data base, said exception grapheme pronunciation dictionary data base, and said phoneme output multi-layer perceptron parameter data base for the input word to perform post-processing pronunciation sequences for the relevant word.

2. The method as claimed in claim 1, wherein said step a) learning a multi-layer perceptron comprises the steps of:
   c) defining similarities between graphemes and phonemes of each word based on knowledge and instances, and setting correspondences between graphemes and phonemes for each word by utilizing a dynamic time warping algorithm;
   d) learning a multi-layer perceptron with grapheme-phoneme mapping data obtained by applying a back-propagation method so as to form a phoneme output multi-layer perceptron network for each grapheme;
   e) inputting a preceding pronunciation dictionary so as to analyze and determine whether said preceding pronunciation dictionary does not correspond to a pronunciation output of said multi-layer perceptron for each grapheme thus formed, and whether one kind of result is always outputted;

f) if said preceding pronunciation dictionary does not correspond to a pronunciation output of said multi-layer perceptron for each grapheme formed, but one kind of result is always outputted, then registering said preceding pronunciation dictionary so as to form an exception grapheme pronunciation dictionary data base, otherwise, determining whether pronunciation sequences outputted for each word corresponds to said preceding pronunciation dictionary; and g) if said pronunciation sequences outputted for each word do not correspond to said preceding pronunciation dictionary, then registering said pronunciation sequences outputted for each word so as to form an exception word pronunciation dictionary data base and, if said pronunciation sequences outputted for each word correspond to said preceding pronunciation dictionary, then registering said pronunciation sequences outputted fro each word so as to form a phoneme output multi-layer perceptron parameter data base for each grapheme.

3. The method as claimed in claim 2, wherein at said step d) learning, an input node receives first graphemes before and after the relevant grapheme, and if a learning performance is specially low, second graphemes before and after the relevant grapheme are inputted by additionally using upstream and downstream clause connection information.

4. The method as claimed in claim 1, wherein said step b) inspecting comprises the steps of:

h) pre-processing a text for candidate words upon inputting a word;

i) determining whether the inputted word has been registered in said exception word pronunciation dictionary database, and if the inputted word has been registered in said exception word pronunciation dictionary data base, then outputting its pronunciation sequences, and if the inputted word has not been registered in said exception word pronunciation dictionary data base, then determining whether the graphemes of the word have been registered in said exception grapheme pronunciation dictionary data base;

j) outputting relevant phonemes if the graphemes of the word have been registered in said exception word pronunciation dictionary data base, and outputting relevant phonemes by said multi-layer perceptron based on said phoneme output multi-layer perceptron parameter data base for each grapheme if the graphemes of the word have not been registered in said exception word pronunciation dictionary data base, and then judging as to whether the phonemes have been outputted as much as the number of graphemes of the inputted word; and k) proceeding to said step i) checking if the phonemes have not been outputted as much as the number of graphemes of the inputted word upon judging at said step j) outputting, post-processing the pronunciation sequences, and outputting final word pronunciation sequences if the phonemes have been outputted as much as the number of the graphemes of the inputted word.

5. The method as claimed in claim 4, wherein in carrying out the post processing on the pronunciation sequences at said step k) proceeding, if connected same phonemes are outputted, this is outputted by reducing them into one, or in a case of a bundled outputting, they are removed.

6. The method as claimed in claim 5, wherein said inputted word consists of English alphabets (graphemes).

7. A recording medium readable by a computer loaded with a program, comprising the functions of:

forming an exception word pronunciation dictionary data base, an exception grapheme pronunciation dictionary data base and a phoneme output multi-layer perceptron parameter data base for respective graphemes by learning a multi-layer perceptron for directly mapping phonemes relevant to respective graphemes by utilizing a neural network; and inspecting said exception word pronunciation dictionary data base, said exception grapheme pronunciation dictionary data base, and said phoneme output multi-layer perceptron parameter data base for the input word to post-processed pronunciation sequences for the relevant word.

8. A method of generating a pronunciation sequence for an unregistered word in a pronunciation recognition system, comprising:

a) forming an exception grapheme pronunciation dictionary database, an exception word pronunciation dictionary database and a phoneme output multi-layer perceptron (MLP) parameter database for respective graphemes through learning a multi-layer perceptron (MLP) which directly maps phonemes for respective graphemes using a neural network; and b) inspecting said exception grapheme pronunciation dictionary database, said exception word pronunciation dictionary database, and said phoneme output multi-layer perceptron (MLP) parameter database for each input word so as to generate a pronunciation sequence for the input word.

9. The method as claimed in claim 8, wherein said step a) comprises the steps of:

defining similarities between graphemes and phonemes of each input word based on knowledge and instances, and setting correspondences between graphemes and phonemes for each input word by utilizing a dynamic time warping (DTW) algorithm;

learning a multi-layer perceptron (MLP) with grapheme-phoneme mapping data so as to form a phoneme output multi-layer perceptron (MLP) network for each grapheme;

determining whether a phoneme output of the multi-layer perceptron (MLP) for each grapheme in a pronunciation dictionary does not correspond to a phoneme in a standard dictionary;

if the phoneme output of the multi-layer perception (MLP) for each grapheme in the pronunciation dictionary does not correspond to the phoneme in the standard dictionary, registering the phoneme output of the multi-layer perception (MLP) for each grapheme so as to form said exception grapheme pronunciation dictionary database;

if the phoneme output of the multi-layer perception (MLP) for each grapheme in the pronunciation dictionary corresponds to the phoneme in the standard dictionary, determining whether a pronunciation sequence output for each input word corresponds to the standard dictionary;

if said pronunciation sequence output for each input word does not correspond to the standard dictionary, registering said pronunciation sequence output for each word so as to form said exception word pronunciation dictionary database; and if said pronunciation sequence output for each word corresponds to the standard dictionary, then registering said pronunciation sequence output for each input word so as to form said phoneme output multi-layer perceptron (MLP) parameter database for each grapheme.

10. The method as claimed in claim 9, wherein, during said step of learning a multi-layer perceptron (MLP) with grapheme-phoneme mapping data, an input node receives first graphemes before and after the relevant grapheme, and if a learning performance is low, second graphemes before and after the relevant grapheme are input by using upstream and downstream clause connection information.

11. The method as claimed in claim 9, wherein said step b) comprises the steps of:

pre-processing the text of each input word for an output pronunciation sequence;

determining whether the input word has been registered in said exception word pronunciation dictionary database;

if the input word has been registered in said exception word pronunciation dictionary database, then outputting its pronunciation sequence;

if the input word has not been registered in said exception word pronunciation dictionary data base, determining whether graphemes of the input word have been registered in said exception grapheme pronunciation dictionary database;

if the graphemes of the input word have been registered in said exception grapheme pronunciation dictionary database, then outputting relevant phonemes;

if the graphemes of the input word have not been registered in said exception grapheme pronunciation dictionary database, outputting relevant phonemes through said multi-layer perceptron (MLP) based on said phoneme output multi-layer perceptron (MLP) parameter database for each grapheme;

determining whether phonemes have been output as many as the number of graphemes of the input word; and if the phonemes have not been output as many as the number of graphemes of the input word, proceeding back to said step of determining whether the graphemes of the input word have been registered in said exception grapheme pronunciation dictionary database; and if the phonemes have been outputted as many as the number of graphemes of the input word, post-processing the pronunciation sequence for the input word and outputting a final pronunciation sequence for the input word.

12. The method as claimed in claim 8, wherein said input word consists of English alphabets (graphemes).

13. The method as claimed in claim 9, wherein said input word consists of English alphabets (graphemes).

14. The method as claimed in claim 10, wherein said input word consists of English alphabets (graphemes).

15. The method as claimed in claim 11, wherein said input word consists of English alphabets (graphemes).

* * * * *

UNITED STATES PATENT AND TRADEMARK OFFICE
CERTIFICATE OF CORRECTION

PATENT NO. : 6,236,965 B1
DATED : May 22, 2001
INVENTOR(S) : Hoi-Rin Kim et al.

It is certified that error appears in the above-identified patent and that said Letters Patent is hereby corrected as shown below:

Title page,
Item [73], Assignee, replace "Electronic Telecommunications Research Institute" with -- Electronics Telecommunications Research Institute --.

Signed and Sealed this

Twenty-fourth Day of September, 2002

Attest:

Attesting Officer

JAMES E. ROGAN
Director of the United States Patent and Trademark Office